United States Patent

[11] 3,620,994

[72] Inventors Edward D. Weil
Hastings-On-Hudson;
Norman H. Gomlak, Tonawanda, both of N.Y.
[21] Appl. No. 872,349
[22] Filed Oct. 29, 1969
[45] Patented Nov. 16, 1971
[73] Assignee Hooker Chemical Corporation
Niagara Falls, N.Y.
Continuation-in-part of application Ser. No. 638,683, Apr. 21, 1967, now abandoned. This application Oct. 29, 1969, Ser. No. 872,349

[54] POLYVINYLCHLORIDE STABILIZATION WITH A LEAD SALT
9 Claims, No Drawings

[52] U.S. Cl................................................. 260/41,
252/400, 260/45.75, 260/435
[51] Int. Cl....................................................... C08f 45/14,
C08f 45/62
[50] Field of Search........................................... 260/45.75,
41 C; 252/400

[56] References Cited
UNITED STATES PATENTS
2,310,449 2/1943 Lightbown .................. 260/45.75

*Primary Examiner*—M. J. Welsh
*Assistant Examiner*—V. P. Hoke
*Attorneys*—Peter F. Casella, Donald C. Studley, Richard P. Mueller and James F. Mudd ABSTRACT: This invention relates to lead salts of mercaptophenol derivatives which have a stabilizing action on polyvinyl chloride, and which also impart a stable yellow coloration thereto, of which typical structural formulas are (a)

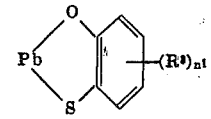

and (b)

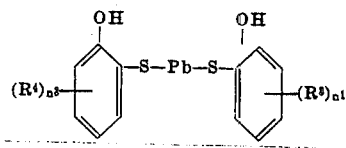

in which $R^3$ and $R^4$ are organic groups, or substituted forms thereof, in which $n^1$ and $n^3$ are each zero to 4.

POLYVINYLCHLORIDE STABILIZATION WITH A LEAD SALT

REFERENCE TO PRIOR APPLICATION

This is a continuation-in-part of copending application Ser. No. 638,683, filed Apr. 21, 1967 now abandoned.

BACKGROUND

This invention is directed to the use of lead salts of orthomercaptophenol derivatives as either a yellow pigment and/or as a polymer stabilizer in a polymer such as polyvinyl chloride.

Basic lead salts of various kinds as stabilizing agents for vinyl resin compositions are well known in the art. Typical lead salts include such compounds as dibasic lead phthalate, dibasic lead phosphite, basic carbonate white lead, basic silicate white lead, tribasic lead sulfate, as well as a basic lead salt of an aromatic polycarboxylic acid having from three to six carboxyl groups substituted on a benzene ring, for example. Typical examples of the latter type compound are basic lead salts of compounds such as trimellitic, trimesic, hemimellitic, pyromellitic, mellophanic, prehnitic, benzene pentacarboxylic and mellitic acids for example, including monobasic, dibasic, tribasic, tetrabasic, or pentabasic salts. The latter compounds are in fact suitable for employment in polyvinyl resin compositions such as polyvinyl chloride polymer.

Also, there are salts of other metals known to be stabilizing agents for resins, such as the tin mercaptobenzylalcohol of U.S. Pat. No. 2,885,415.

Although many of the above types of stabilizers are desirable for particular types of compositions, and although any one or more of the known stabilizers may well have some advantage over other stabilizers, there is still a demand for improved stabilizers and particularly a demand for stabilizers which can be produced at a low cost.

Also, although there are many known pigments for imparting coloration to various compounds, it is particularly desirable to obtain pigments which do not have an adverse effect on the compound to which it is added, particularly when being employed as a part of a polymer composition such as polyvinyl chloride. It is also desirable that a pigment impart some additional advantageous desirable property to the composition, in addition to the imparting of a stable color not readily subject to discoloration.

An object of this invention is to provide polymer compositions characterized by superior stability.

Another object of the invention is the use of compounds characterized by a stable color and suited for use as a pigment for imparting yellow coloring to compositions such as polyvinyl chloride.

Another object of this invention is the use of particular stabilizing compounds for imparting color and stabilizing action to compositions such as polyvinyl chloride.

Another object is the use of compounds fulfilling one or more of the above objects, and which are characterized by a low cost of production.

Other objects are apparent from the following disclosure.

DESCRIPTION OF THE INVENTION

The above objects are unexpectedly fulfilled by the use of lead salts of phenolic derivatives, produced by the following typical process comprising, for example, reacting in an inert atmosphere, an admixture (solution) of (a) orthomercaptophenol (such as $HS-C_6H_4-OH$), in an aqueous solution of sodium hydroxide and (b) a solution of lead acetate, sufficiently to form the preferred embodiment of this invention, a precipitate normally yellow in color, having an empirical formula of $Pb\ C_6H_4OS$ as based on percent composition: Pb—about 62.5 percent; S—about 8.9 percent. The compound formed as at least the major part of the precipitate is of the formula:

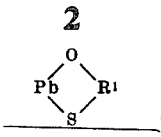

in which $R^1$ is an orthophenolic derivative, a typical preferred bivalent lead compound being the lead salt of an orthomercaptophenol of the formula:

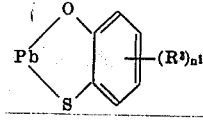

in which $n^1$ is from zero to 4, and in which $R^3$ is typically selected from the members consisting of alkyl, alkenyl, alkynyl, aryl, aralkyl, substituted forms thereof, and the like. The preferred lead salts to use in this invention are the 1:1 lead salts of phenolic derivatives, the preferred phenolic being orthomercaptophenol. The 1:1 refers to the stoichiometric proportions of lead and mercaptophenol (for example) employed in the reaction.

The lead salt-phenolic derivatives to be used in this invention typically may be represented by the formulas:

(a) 

and (b) $Pb(-S-R^1-OH)_2$ in which $R^1$ and $R^2$ are arylene groups such as phenylene, naphthalene and anthralene, or substituted forms thereof. In a preferred embodiment, the substituents, $R^3$ and $R^4$, of the organic members each are selected from the group consisting of alkyl, alkenyl, alkynyl, aryl, aralkyl, and substituted forms thereof. A generic structural formula representative of compounds of this type is as follows:

0003

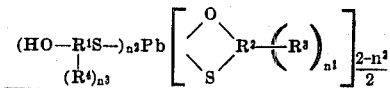

in which Pb is divalent, in which $R^1$, $R^2$, $R^3$, $R^4$ and $n^1$ are defined above, and $n^2$ is zero or 2, $n^3$ is from zero to 4. Other mercaptophenolic derivatives include the divalent lead salts of either of polycyclic phenolics or of fused-ring compounds such as orthomercaptonaphthol and orthohydroxy (mercaptoanthracene), for example. Typical substituents ($R^3$ defined above) similarly may be phenylene and fused-ring compounds, provided the properties of the compounds of this invention are not affected adversely.

The preferred embodiment of this invention is a composition comprising a polyvinyl halide polymer such as polyvinyl chloride polymer having substantially improved stability, as a result of the inclusion of at least a stabilizing amount of a stabilizing compound described above. The compounds of the invention can be used in other equivalent polymers, especially in copolymer combinations such as copolymer of vinyl chloride and vinyl acetate, for example. In the polymer compositions of the invention, the stabilizer is included in an amount ranging from about 0.1 percent to about 5 percent or more by weight.

As noted above, some to be used in the stabilizing compounds of this invention are also characterized by a distinguishing yellow color which is not readily subject to discoloration, and are useful as improved pigment forms imparting yellow coloration to a composition such as polyvinyl chloride, for example. The intensity of color imparted is dependent upon the concentration of the pigment.

In the process described above for the producing of the compounds to be used in this invention, it should be noted that any one or more basic materials in aqueous solution may be employed, such as sodium hydroxide, potassium hydroxide, calcium hydroxide, ammonium hydroxide, and the like. Similarly, any conventional lead salts having at least a limited degree of solubility (i.e. substantially soluble), preferably highly soluble, such as organic lead salts or hydrates thereof may be employed. Typical salts include inorganic salts such as lead chlorate, lead nitrate, and lead persulfate, and organic salts such as lead persulfate, lead dithionate, lead oxalate, lead butyrate, lead propionate, and lead acetate, the acetate being the preferred salt. The above-listed typical inorganic salts are not preferred because of their high oxidizing potential. Similarly the lead persulfate is an active oxidizer. It is readily apparent that except for solubility during reaction, the nature of the lead organic salts is not critical to the invention since the anion of the salt is not an integral part of the composition of this invention.

In a preferred process, divalent lead oxide is the preferred lead reactant and orthomercaptophenol is the preferred mercaptophenolic compound. The mercaptophenols also include 2-mercapto-4-methylphenol, 2-mercapto-6-dodecylphenol, 2-mercapto-4,6-dimethylphenol, 2-mercapto-4-vinylphenol, 2-mercapto-6-ethynylphenol, 2-mercapto-4-α-propenylphenol, 2-mercapto-4-α-propenyl-6-methoxyphenol, 2-mercapto-4-phenylphenol, 2-mercapto-4-benzyl-6-chlorophenol, 2-mercapto-4-cyclohexylphenol, 2-mercapto-6-phenoxyphenol, 2-mercaptohydroquinone.

The unexpectedly superior results obtained as a stabilizer by the employment of the lead compound in this invention is readily illustrated by comparison with a tin salt of an analogous structure, the tin salt having little or no utility as a stabilizer. Examples illustrating this are included below.

The following examples are given by way of illustration of various embodiments of this invention and to illustrate the superiority of the results obtained from various embodiments of this invention, and accordingly, the following examples are not intended to limit the scope of this invention. All parts are by weight unless otherwise stated.

EXAMPLE I

To a solution of 4 g. (0.1 mole) of sodium hydroxide in 150 ml. of water were added (under $N_2$ atmosphere) 6.3 g. (0.05 mole) of o-mercaptophenol. When the latter dissolved, a solution of 19 g. (0.05 mole) of lead acetate was added, and the mixture was stirred. The precipitate was filtered out and dried in a vacuum to obtain 17.5 g. of yellow solid. The product is the 1:1 cyclic lead salt of o-mercaptophenol.

EXAMPLE II

Typical recipe for rigid vinyl: Polyvinyl chloride: 50 parts; calcium stearate (milling lubricant): 0.5 parts; product of example 1; 0.5 parts. The mixture was milled 7 minutes at 155° C. into a sheet of homogenous polymer bearing an attractive yellow color.

EXAMPLE III

Test: put milled rigid vinyl sample in oven at 170° C. for 30, 60, 120, and 180 minutes. For each of (A) lead phosphate, (B) basic lead carbonate, (C) a 1:1 cyclic lead salt of orthomercaptophenol, to be used in this invention, (D) a 1:1 di-n-butyltin salt of the sodium salt of orthomercaptophenol, and (E) a control containing no stabilizer, these compositions were admixed at 1 percent by weight in polyvinyl chloride film, and also in each about 1 percent, by weight, of calcium stearate was included as a lubricant. The results are disclosed in table I below, in which the state of the polyvinyl chloride film is represented by number ranging from 1 (clear—i.e., stable) to 10 (black—i.e., degraded).

TABLE I

| Sample | Off | | | | |
|---|---|---|---|---|---|
| Composition | Mill | 30 min. | 60 min. | 120 min. | 180 min. |
| A | 2 | 3 | 4 | 6 | 7 |
| B | 2 | 5 | 6 | 8 | 9 |
| C | 1 | 2 | 3 | 4 | 5 |
| D | 1 | 4 | 8 | 9 | 10 |
| E | 3 | 6 | 7 | 8 | 10 |

EXAMPLE IV

Preparation of Noncyclic Lead Salt of o-Mercaptophenol

During a 15 minute period a solution of 37.9 g. of lead acetate dihydrate (0.1 mole) in 100 ml. of water was added to a well-stirred and nitrogen-purged solution of 25.2 g. of o-mercaptophenol (0.2 moles), 8 g. of sodium hydroxide (0.2 mole) and 100 ml. of water. The resulting yellow slurry was stirred for 1 hour and then filtered. After reslurrying and filtering the product three times it was collected and dried over anhydrous $CaCl_2$. It weighed 47 g.

Anal. Calc'd percentages for $C_{12}H_{10}O_2S_2Pb$: S, 14.0; Pb, 45.2; hydroxyl 7.4. Found S, 13.1; Pb, 46.3; hydroxyl, 6.9.

EXAMPLE V

Mixtures containing 50 g. of polyvinylchloride, 16.5 g. of dioctyl phthalate and 0.13 g. of stearic acid were combined with 0.5 g. of the following stabilizer candidates. These compositions were compounded on a two-roll rubber mill and then heated at 177° C. for 10 minutes. The compounds are listed in order of decreasing stabilizing effect in table II.

TABLE II.—PVC COMPOSITION

| Compound | Color | Strength |
|---|---|---|
| 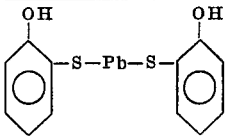 Bis(2-hydroxyphenyl) lead-mercaptide | Bright yellow | Tough. |
| 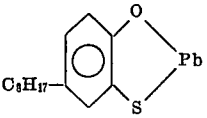 Lead cyclic 4-t-octyl-2-mercaptophenate | Light tan | Do. |
| 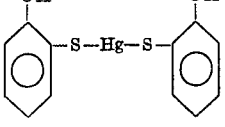 Bis(2-hydroxyphenyl)mercury mercaptide | Dark tan | Do. |
| 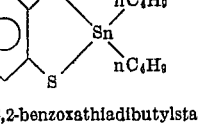 1,3,2-benzoxathiadibutylstannole | do | Do. |
| 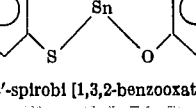 2,2'-spirobi [1,3,2-benzooxathiastannole] | Black | Crumbly. |

TABLE II.—PVC COMPOSITION

| Compound | Color | Strength |
|---|---|---|
| 5-t-octyl-1,3,2-benzooxathiastannile 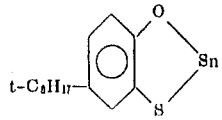 | ...do... | Do. |
| 1,3,2-benzooxathiastannile 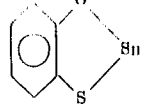 | ...do... | Do. |

EXAMPLE VI

The compositions of table III below, were each milled on a two-roll rubber mill at about 177° C. for about 30 minutes. Samples were each removed periodically. All four compositions became slightly darker after this treatment but none deteriorated significantly. The changes in color and appearance of compositions C' and D' were similar to the changes in color and appearance of compositions A' and B' containing the known stabilizers.

TABLE III

| Stabilizer | Example VI Compositions |
|---|---|
| Basic Lead Phosphite (2PbO·PbHPO$_3$·1/2H$_2$O) | A' |
| Basic Lead Carbonate (2PbCO$_3$·H$_2$O) | B' |
| Cyclic Lead Salt of o-Mercaptophenol | C' |
| Cyclic Lead Salt of 2,4-di-t-butyl-6-mercaptophenol | D' |

Thus, example VI illustrates that compounds within the scope of this invention (such as C' and D' of table III) are at least equal in stabilizing action (in polyvinyl chloride) to known stabilizers (such as A' and B' of table III). However, it should be noted that the example III (B) basic lead carbonate (which is similar to the example VI B') was shown in table I to be inferior to the example III (C) (which is similar to the example VI C') possibly superior composition of this invention.

The samples of table II containing a lead-compound stabilizer of this invention showed less degradation than either the control or the sample containing the tin compound.

It is within the scope of this invention to employ substitutes and equivalents thereof to the extent that such would be obvious to a person of ordinary skill in the art of stabilization of polymer such as polyvinyl chloride, and in the art of employment of pigments for the coloration of various compositions.

What is claimed is:

1. A composition comprising a polymer selected from the group consisting of polyvinyl chloride and a copolymer of vinyl chloride and a lead compound of the formula:

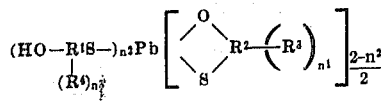

in which Pb is divalent, in which $R^1$ and $R^2$ are each selected from the group consisting of phenylene, napthylene and anthrylene, in which $n^1$ and $n^3$ are each zero to 4, $n^2$ is zero or 2 and in which $R^3$ and $R^4$ are each selected from the group consisting of alkyl, alkenyl, alkynyl, aryl and aralkyl.

2. The composition of claim 1 wherein the lead compound is

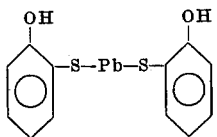

3. The composition of claim 1 wherein the lead compound is the cyclic lead salt of 2,4-di-t-butyl-6-mercaptophenol.
4. The composition of claim 1 wherein the lead compound is lead cyclic 4-t-octyl-2-mercaptophenate.
5. The composition of claim 1 wherein the lead compound is the cyclic lead salt of o-mercaptophenol.
6. The composition of claim 1 wherein the polymer is polyvinyl chloride and the lead compound is

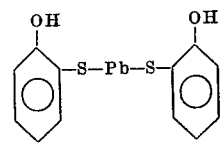

7. The composition of claim 1 wherein the polymer is polyvinyl chloride and the lead compound is the cyclic lead salt of 2,4-di-t-butyl-6-mercaptophenol.
8. The composition of claim 1 wherein the polymer is polyvinyl chloride and the lead compound is lead cyclic 4-t-octyl-2-mercaptophenate.
9. The composition of claim 1 wherein the polymer is polyvinyl chloride and the lead compound is the cyclic lead salt of o-mercaptophenol.

* * * * *